(12) United States Patent
Kazandzhan

(10) Patent No.: US 8,746,237 B2
(45) Date of Patent: Jun. 10, 2014

(54) SOLAR COLLECTOR (EMBODIMENTS) AND A METHOD FOR PRODUCING A SOLAR COLLECTOR ENCLOSURE

(76) Inventor: Boris Ivanovich Kazandzhan, Moscow (RU)

( * ) Notice: Subject to any disclaimer, the term of this patent is extended or adjusted under 35 U.S.C. 154(b) by 963 days.

(21) Appl. No.: 12/663,268

(22) PCT Filed: Oct. 24, 2007

(86) PCT No.: PCT/RU2007/000586
§ 371 (c)(1),
(2), (4) Date: Apr. 2, 2010

(87) PCT Pub. No.: WO2008/150189
PCT Pub. Date: Dec. 11, 2008

(65) Prior Publication Data
US 2011/0283994 A1    Nov. 24, 2011

(30) Foreign Application Priority Data
Jun. 4, 2007   (RU) ................................ 2007120529

(51) Int. Cl.
*F24J 2/46*    (2006.01)

(52) U.S. Cl.
USPC ........... 126/704; 126/655; 126/656; 126/660; 126/661; 126/662; 126/705; 126/706; 126/707; 126/709; 126/710; 126/711

(58) Field of Classification Search
USPC ......... 126/652, 684, 655, 704, 569, 621, 622, 126/651, 654, 658, 662, 686, 692, 705, 706, 126/707, 708; 29/890.033; 165/48.2; 156/218, 217, 203, 463, 466, 196, 212, 156/215, 242, 308.8, 309.6; 114/295; 228/114.5; 413/116, 59, 72, 74
See application file for complete search history.

(56) References Cited

U.S. PATENT DOCUMENTS 600,745 A * 3/1898 Sands .............................. 229/93
(Continued)

FOREIGN PATENT DOCUMENTS

| AT | 403844 B | 5/1998 |
|---|---|---|
| RU | 2224188 C1 | 2/2004 |

(Continued)

OTHER PUBLICATIONS

International Search Report mailed Feb. 21, 2008, in related International Application No. PCT/RU2007/000586.

*Primary Examiner* — Jorge Pereiro
(74) *Attorney, Agent, or Firm* — TransPacific Law Group; Pavel I. Pogodin, Esq.

(57) ABSTRACT

This invention relates to solar engineering. The solar collector, which comprises a closed enclosure and an absorber 5 with channels for a liquid heat carrier, is designed in the form of a cylindrical portion having radius R1 and an axis coinciding with the axis of the central cylindrical portion 1 of the enclosure. The absorber 5 consists of thin-walled, interconnected modules. The modules are provided with bulges on the rear side thereof, in which channels with slots are made for arranging pipes forming heat-carrier flowing channels. In addition, the absorber can be designed in the form of a storage tank. The shape of the collector is optimized in such a way that the axes of the two lateral cylindrical portions 2 thereof are remote at distance L and the central cylindrical portion 1 is as remote as possible from a plane 3 tangential to the lateral cylindrical portions 2 at a distance H having the defined ratio of geometric parameters. The enclosure of the solar collector is made from a sheet of one- or multi-layered polymer material by placing a guiding cylinder therein, heating said polymer material to the softening point, and bending it around the cylinder in order to form the lateral cylindrical portions 2. The edges of the sheet are then drawn together and joined.

19 Claims, 6 Drawing Sheets

(56) References Cited

U.S. PATENT DOCUMENTS

| | | | | |
|---|---|---|---|---|
| 1,620,239 A * | 3/1927 | Smith | | 493/274 |
| 2,722,590 A * | 11/1955 | Engler | | 219/200 |
| 2,918,023 A * | 12/1959 | Bettcher | | 52/22 |
| 3,233,870 A * | 2/1966 | Gerhardt | | 256/13.1 |
| 3,274,047 A * | 9/1966 | Sloan | | 428/166 |
| 3,921,847 A * | 11/1975 | Rentmeester | | 220/62.14 |
| 4,011,856 A * | 3/1977 | Gallagher | | 126/659 |
| 4,015,586 A * | 4/1977 | Vroom et al. | | 126/587 |
| 4,036,209 A * | 7/1977 | Press | | 202/234 |
| 4,069,811 A * | 1/1978 | Tabor | | 126/655 |
| 4,072,142 A * | 2/1978 | Lof | | 126/675 |
| 4,080,956 A * | 3/1978 | Dawley | | 126/638 |
| 4,084,574 A * | 4/1978 | Golay | | 126/661 |
| 4,106,481 A * | 8/1978 | van Kuijk | | 126/605 |
| 4,112,918 A * | 9/1978 | Palkes | | 126/596 |
| 4,120,284 A * | 10/1978 | Cotsworth et al. | | 126/659 |
| 4,122,831 A * | 10/1978 | Mahdjuri | | 126/657 |
| 4,127,926 A * | 12/1978 | White | | 29/453 |
| 4,129,119 A * | 12/1978 | Yoke | | 126/607 |
| 4,151,829 A * | 5/1979 | Wilson | | 126/683 |
| 4,158,908 A * | 6/1979 | Block et al. | | 29/890.033 |
| 4,164,932 A * | 8/1979 | Gavin | | 126/659 |
| 4,172,311 A * | 10/1979 | Heyman | | 29/890.033 |
| 4,185,616 A * | 1/1980 | Johnson | | 126/652 |
| 4,186,723 A * | 2/1980 | Coppola et al. | | 126/570 |
| 4,187,273 A * | 2/1980 | Stratis | | 264/322 |
| 4,187,596 A * | 2/1980 | Nevins | | 29/890.033 |
| 4,192,454 A * | 3/1980 | Rugenstein | | 126/592 |
| 4,196,562 A * | 4/1980 | Hirschman | | 53/450 |
| 4,210,463 A * | 7/1980 | Escher | | 136/246 |
| 4,214,797 A * | 7/1980 | Borresen et al. | | 312/257.1 |
| 4,231,353 A * | 11/1980 | Kanatani et al. | | 126/652 |
| 4,248,210 A * | 2/1981 | Ortega | | 126/666 |
| 4,265,221 A * | 5/1981 | Whinnery | | 126/591 |
| 4,270,524 A * | 6/1981 | Bachli | | 126/655 |
| 4,271,825 A * | 6/1981 | Schwob et al. | | 126/705 |
| 4,273,104 A * | 6/1981 | Uroshevich | | 126/652 |
| 4,284,067 A * | 8/1981 | Kilar | | 126/620 |
| 4,300,538 A * | 11/1981 | Uroshevich | | 126/649 |
| 4,305,235 A * | 12/1981 | Roston | | 52/2.17 |
| 4,305,385 A * | 12/1981 | Heuser | | 126/621 |
| 4,319,437 A * | 3/1982 | Murphy | | 52/220.1 |
| 4,326,500 A * | 4/1982 | Bernhardt et al. | | 126/625 |
| 4,333,448 A * | 6/1982 | Johnson | | 126/714 |
| 4,339,484 A * | 7/1982 | Harding | | 428/34.6 |
| 4,341,204 A * | 7/1982 | Bloxsom | | 126/651 |
| 4,343,298 A * | 8/1982 | Ambille et al. | | 126/687 |
| 4,345,587 A * | 8/1982 | Carvalho | | 126/662 |
| 4,377,155 A * | 3/1983 | Tonomura et al. | | 359/852 |
| 4,392,008 A * | 7/1983 | Cullis et al. | | 136/248 |
| 4,397,304 A * | 8/1983 | Villain | | 126/593 |
| 4,470,406 A * | 9/1984 | Rinklake et al. | | 126/622 |
| 4,495,936 A * | 1/1985 | Frommhold | | 126/624 |
| 4,515,149 A * | 5/1985 | Sgroi et al. | | 126/651 |
| 4,537,180 A * | 8/1985 | Minor | | 126/640 |
| 4,566,927 A * | 1/1986 | Wood | | 156/203 |
| 4,674,477 A * | 6/1987 | Tabor | | 126/652 |
| 4,686,960 A * | 8/1987 | Kleinwachter | | 126/585 |
| 4,738,247 A * | 4/1988 | Moore | | 126/622 |
| 4,918,938 A * | 4/1990 | De Forest et al. | | 62/238.6 |
| 4,954,356 A * | 9/1990 | Kappes | | 426/107 |
| 5,022,381 A * | 6/1991 | Allegro | | 126/622 |
| 5,047,101 A * | 9/1991 | Trussler | | 156/69 |
| 5,143,053 A * | 9/1992 | Baer | | 126/662 |
| 5,255,666 A * | 10/1993 | Curchod | | 126/569 |
| 5,323,763 A * | 6/1994 | Lechner | | 126/626 |
| 5,596,981 A * | 1/1997 | Soucy | | 126/704 |
| 5,653,222 A * | 8/1997 | Newman | | 126/653 |
| 5,860,414 A * | 1/1999 | Steinmann | | 126/657 |
| 5,967,140 A * | 10/1999 | Winston et al. | | 126/657 |
| 6,000,393 A * | 12/1999 | Moore | | 126/621 |
| 6,047,697 A * | 4/2000 | Best | | 126/635 |
| 6,120,634 A * | 9/2000 | Harrold et al. | | 156/203 |
| 6,183,584 B1 * | 2/2001 | Avenell | | 156/158 |
| 6,223,743 B1 | 5/2001 | Prueitt | | |
| 6,228,195 B1 * | 5/2001 | Spatz et al. | | 156/64 |
| 6,857,426 B2 * | 2/2005 | Besier | | 126/685 |
| 7,610,911 B2 * | 11/2009 | Neumann et al. | | 126/622 |
| 7,992,553 B2 * | 8/2011 | Le Lievre | | 126/635 |
| 8,262,826 B1 * | 9/2012 | Heller | | 156/196 |
| 2002/0153457 A1 * | 10/2002 | Cumby | | 248/27.8 |
| 2005/0076997 A1 * | 4/2005 | Brinkmann | | 156/203 |
| 2008/0011289 A1 * | 1/2008 | Sichanugrist et al. | | 126/634 |
| 2008/0190414 A1 * | 8/2008 | Link | | 126/651 |
| 2008/0308092 A1 * | 12/2008 | Schaap et al. | | 126/617 |
| 2009/0019795 A1 * | 1/2009 | Szacsvay et al. | | 52/173.3 |
| 2009/0064992 A1 * | 3/2009 | Lalive et al. | | 126/660 |
| 2010/0043780 A1 * | 2/2010 | Lin et al. | | 126/698 |
| 2011/0048409 A1 * | 3/2011 | Messmer | | 126/663 |
| 2011/0088780 A1 * | 4/2011 | Hambrock | | 136/259 |
| 2011/0232632 A1 * | 9/2011 | Duke | | 126/621 |
| 2011/0297143 A1 * | 12/2011 | Le Lievre | | 126/652 |
| 2012/0042872 A1 * | 2/2012 | McEntee et al. | | 126/652 |
| 2012/0067335 A1 * | 3/2012 | Freller | | 126/569 |
| 2012/0205087 A1 * | 8/2012 | Eaton | | 165/181 |

FOREIGN PATENT DOCUMENTS

| | | | |
|---|---|---|---|
| WO | WO 96/01400 A1 | 1/1996 | |
| WO | WO 00/03185 A1 | 1/2000 | |
| WO | WO 2004090436 A1 * | 10/2004 | F24J 2/04 |

* cited by examiner

SOLAR COLLECTOR (EMBODIMENTS) AND A METHOD FOR PRODUCING A SOLAR COLLECTOR ENCLOSURE

FIELD OF THE INVENTION

The present invention relates to solar engineering and, in particular, to devices that convert electromagnetic energy from the Sun into thermal energy for heating a heat carrier.

DESCRIPTION OF THE BACKGROUND ART

A conventional solar collector comprises an enclosure made from a transparent single- or multi-layered polymer material having a width L and consisting of a central cylindrical portion having radius R, two lateral cylindrical portions that have radius r and are connected to the edges of the central cylindrical portion, and a plane portion tangential to the lateral cylindrical portions, two end-face covers installed on the enclosure end faces, and a heat-receiving device arranged inside the enclosure for transferring heat to a heat carrier, the front side of the heat-receiving device being coated with a selective coating while the rear side thereof having thermal insulation. A heat-receiving device has width H and thickness t. The enclosure width H and values of radiuses R and r satisfy the following conditions:

$5H>R>3H; 1.5t>r>(\sqrt{2}/2)t; 1.1H>L>1.05H.$

The heat-receiving device can be produced in the form of a flat absorber with channels for circulation of a liquid heat carrier or in the form of a storage tank (see RU 2224188 C1).

However, in the conventional solar collector with a flat and bent heat receiver (absorber), the shape of the enclosure is not optimized with regard to maximal efficiency in combination with low cost and a minimal material/power ratio. In the conventional solar collector, the configuration of the transparent enclosure is linked to a thickness of the flat absorber according to the following ratio:

$1.5t>r>(\sqrt{2}/2)t.$

Such a relationship between the dimensions of t and r is optimal for an absorber beveled on the sides. In this case, thickness t of the absorber is defined as the distance from the edge of the bevel to the plane of the absorber. In widely used absorbers that do not have side bevels, the aforementioned relationship between r and t loses its meaning since the bevels are absent, and criteria other than those mentioned above are needed for optimizing the enclosure shape. Furthermore, no provisions are made in the conventional solar collector for use of absorbers having a curvilinear shape.

A method known in the art for manufacturing a solar-collector enclosure involves cutting out four triangular slots in the surface of the sheet and arranging the slots along both edges of the sheet and at predetermined angles to the sheet edges. Distances between the slots correspond to the dimensions of the collector sides. Shelves with triangular slots are bent from both edges of the sheet, the sheet is bent around the sides of the collector along the lines that connect apexes in the respective triangular slots, and the free edges of the sheet are then interconnected (see WO 00/03185 A1).

However, the above-described conventional method for manufacturing a solar collector enclosure requires that the triangular slots that are cut out from the sheet be strictly aligned on both sides of the sheet. If this is not done, the angle of the fold will be skewed. Therefore, this operation requires the use of precision equipment. Because the sheet has a certain thickness, it is impossible to achieve a direct angle at the corner of the fold, and the angle that is formed leads to a permanent slit on the face side where the edges of the triangular slots must merge at 45°.

SUMMARY OF THE INVENTION

It is a feature of the present invention to provide an enclosure that is optimally shaped with respect to specific types of absorbers. It is another feature to provide a method of manufacturing the enclosure from a single- or multi-layered polymer material for use as a transparent protector for the absorbers of various designs that are used or may be used in solar collectors.

According to the first aspect of the invention, the above objects are achieved by providing a solar collector comprising an enclosure made from a transparent single-layered or multi-layered polymer material comprising a central cylindrical portion having radius R, two lateral cylindrical portions that have radius r and are connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of an absorber with channels for circulation of a liquid heat carrier, the front side of the absorber being coated with a selective coating while the rear side thereof having thermal insulation. According to an embodiment of the invention, the absorber is defined by a cylindrical portion having an axis that coincides with the axis of the central cylindrical portion of the enclosure and consists of thin-walled modules connected to each other and having on their rear sides bulges that have channels with inward-facing slits, the channels for circulation of the heat carrier being formed by tubes pressed into the channels with slits, the axes of two lateral cylindrical portions of the enclosure being spaced at distance L, the central cylindrical portion being spaced at maximum distance H from the plane portion, and the following ratios being observed:

$8>L/H>3.5; 10>R/H>4.5; \text{ and } 4.2>H/r>3.8.$

In the collector made according to the first embodiment of the invention, the above objectives are accomplished by providing the collector with a rigidity rod arranged inside the enclosure and oriented in the longitudinal direction of the enclosure in the vicinity of its central cylindrical portion.

In the collector made according to the first embodiment of the invention, the above objectives are also accomplished by providing the collector with a rigidity rod that is located inside the enclosure and extends in the longitudinal direction of the enclosure in the vicinity of the plane portion.

According to the second embodiment of the invention, the above objects are achieved by providing a solar collector comprising an enclosure made from a transparent single-layered or multi-layered polymer material comprising a central cylindrical portion having radius R, two lateral cylindrical portions that have radius r and are connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of an absorber with channels for circulation of a liquid heat carrier, the front side of the absorber being coated with a selective coating while the rear side thereof being provided with thermal insulation having thickness δ, wherein, according to the invention, the absorber is defined by a cylindrical portion having an axis that coincides with the axis of the central cylindrical portion of the enclosure and consists of thin-walled modules connected to each other and having on their rear sides bulges that have channels with inward-facing slits, the channels for circulation of the heat carrier being formed by tubes pressed into the channels with slits, the axes of two lateral cylindrical portions of the enclosure being spaced at distance L, the central cylindrical portion being spaced at maximum distance H from the plane portion, and the following ratios being observed:

$3>L/H>2$; $3.5>R/H>1.1$; $9>H/r>5$; and $2>r/\delta>0.4$.

In the collector made according to the second embodiment of the invention, the above objectives are also accomplished by providing the collector with a rigidity rod that is located inside the enclosure and extends in the longitudinal direction of the enclosure in the vicinity of the central cylindrical portion.

In the collector made according to the second embodiment of the invention, the above objectives are also accomplished by providing the collector with an additional rigidity rod that is located inside the enclosure and extends in the longitudinal direction of the enclosure in the vicinity of the plane portion.

In the collector made according to the second embodiment of the invention, the above objectives are also accomplished by providing the collector with a hollow insert located between the absorber and thermal insulation.

According to the third embodiment of the invention, the above objects are achieved by providing a solar collector comprising an enclosure made from a transparent single-layered or multi-layered polymer material comprising a central cylindrical portion having radius R, two lateral cylindrical portions that have radius r and are connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of a flat absorber with channels for circulation of the liquid heat carrier, the front side of the absorber being coated with a selective coating while the rear side thereof being provided with thermal insulation having thickness δ, wherein, according to the invention, the absorber consists of thin-walled modules connected to each other and having on their rear sides bulges that have channels with inward-facing slits, the channels for circulation of the heat carrier being formed by tubes pressed into the channels with slits, the axes of two lateral cylindrical portions of the enclosure being spaced at distance L, the central cylindrical portion being spaced at maximum distance H from the plane portion, and the following ratios being observed:

$8>L/H>5$; $18>R/H>6$; $5>H/r>3$; and $2>r/\delta>0.4$.

In the collector made according to the third embodiment of the invention, the above objectives are also accomplished by providing the collector with a rigidity rod that is located inside the enclosure and extends in the longitudinal direction of the enclosure in the vicinity of the central cylindrical portion.

In the collector made according to the third embodiment of the invention, the above objectives are also accomplished by providing the collector with an additional rigidity rod that is located inside the enclosure and extends in the longitudinal direction of the enclosure in the vicinity of the plane portion.

According to the fourth embodiment of the invention, the above objects are achieved by providing a solar collector comprising an enclosure made from a transparent single-layered or multi-layered polymer material comprising a central cylindrical portion having radius R, two lateral cylindrical portions that have radius r and are connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of a storage tank that has a selective coating on its front side and thermal insulation having thickness δ on the rear side, wherein, according to the invention, the storage tank is defined by a cylindrical portion having an axis that coincides with the axis of the central cylindrical enclosure and by a plane that is parallel to the plane of the enclosure, the axes of the two lateral cylindrical portions of the enclosure being spaced at distance L, the central cylindrical portion being spaced at maximum distance H from the plane portion, and the following ratios being observed:

$3>L/H>2$; $3.5>R/H>1.1$; $9>H/r>5$; and $2>r/\delta>0.4$.

In the collector made according to the fourth embodiment of the invention, the above objectives are also accomplished by providing the collector with a rigidity rod that is located inside the enclosure and extends in the longitudinal direction of the enclosure in the vicinity of the central cylindrical portion.

In the collector made according to the fourth embodiment of the invention, the above features are also achieved by providing the collector with an additional rigidity rod that is located inside the enclosure and extends in the longitudinal direction of the enclosure in the vicinity of the plane portion.

According to the method of an embodiment of the invention, the above features are achieved by placing a guiding cylindrical member having radius r onto the surface of a single- or multi-layered sheet of a transparent polymer material along one of the sheet edges, increasing the temperature of the polymer material along the guiding cylindrical member to the softening point of this material by means of a heater, bending the sheet around the cylindrical member to form one lateral cylindrical portion having radius r, arranging the guiding cylindrical member on the sheet surface along the opposite edge of the sheet at distance L from the first position of the cylindrical member and symmetrically thereto, increasing the temperature of the polymer material along the guiding cylindrical member to the softening point of the polymer material, bending the sheet around the cylindrical member to form another lateral cylindrical portion having radius r and a gap between the edges of the bent sheet, bringing the edges in contact with each other and bonding them together so that a plane portion is formed on the edge-connection side opposite to central cylindrical portion that has radius R.

In the method of an embodiment of the invention, the above objectives are also accomplished by using an additional guiding cylindrical member having radius r.

In the method of an embodiment of the invention, the above objectives may also be accomplished by means of a step in which during bending of the sheet around the guiding cylindrical member, the plane portions of the sheet are fixed in the horizontal position.

In the method of an embodiment of the invention, the above objectives may also be accomplished by means of a step in which during bending of the sheet around the guiding cylindrical member, the plane portions of the sheet are fixed in an inclined position.

DESCRIPTION OF THE INVENTION

Figure 1:
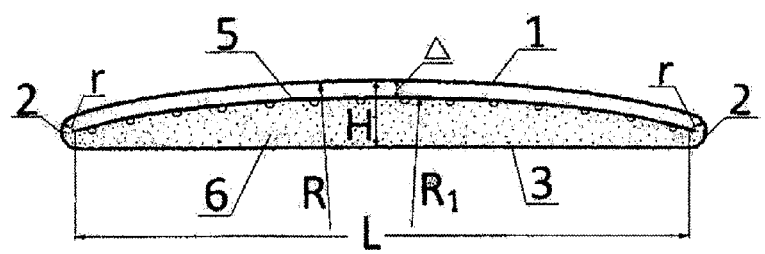
FIG. 1 illustrates a solar collector according to the first embodiment of the invention, wherein the heat-receiving device is made in the form of an absorber defined by a cylindrical portion.
Figure 2:
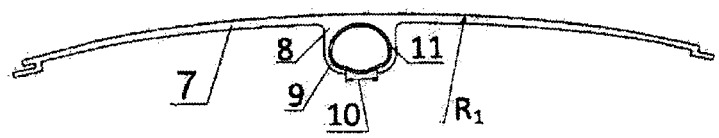
FIG. 2 illustrates one of the thin-walled modules from which the absorber of the invention is formed.
Figure 3:
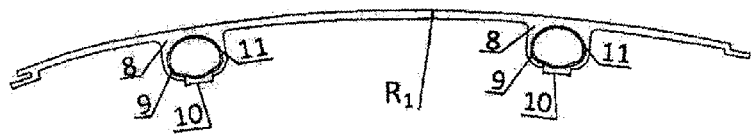
FIG. 3 illustrates an embodiment of the thin-walled module of the invention.

According to the first embodiment of the invention (FIG. 1), the solar collector comprises an enclosure made, e.g., from a transparent single- or multi-layered polymer material, e.g., from cellular polycarbonate with transverse orientation of channels. The enclosure consists of a central cylindrical portion 1 having radius R, two lateral cylindrical portions 2 that have radius r and are connected to the central cylindrical portion, a plane portion 3 tangential to the lateral cylindrical portions 2, two end-face covers 4 installed on the enclosure end faces, and a heat-receiving device arranged inside the enclosure for transferring heat to a heat carrier and made in the form of an absorber 5 with channels for circulation of the liquid heat carrier. The front side of the absorber is coated with a selective coating capable of absorbing solar radiation, while the rear side of the absorber is covered with a thermal insulation 6. A cylindrical portion having radius R1 defines the absorber 5. The axis of this cylindrical portion coincides with the axis of the central cylindrical portion 1, which is spaced from the cylindrical portion of the absorber at distance $\Delta$. The value of $\Delta$ ($\Delta = R - R_1$) is determined from the minimal condition of the coefficient of convection heat transfer in the air gap between the surfaces of the aforementioned heat-exchange portions and comprises a function of the collector inclination angle. The final value of $\Delta$ is selected on the basis of the collector inclination angle at which the collector is installed, depending on the latitude of the installation site. In other words, the recommended angle of collector inclination corresponds to the geographic latitude of the collector installation site. Due to the fact that the surface of the absorber 5 is curved over the radius $R_1$, with some insignificant additional manufacturing steps, it possible to optimize the distance between the surface of the absorber 5 and the central cylindrical portion 1 of the enclosure and at the same time to increase the amount of solar energy received by the collector. The absorber 5 consists of thin-walled modules 7 (FIGS. 2 and 3) connected to each other with a butt connection or with use of locking elements on their ends. On their rear sides, the modules 7 have bulges 8 with channels 9, which are provided with inward facing slits 10. The channels for circulation of the heat carrier are formed by tubes 11 that are pressed into the channels 9. The axes of two lateral cylindrical portions 2 of the enclosure are spaced at distance L, and the central cylindrical portion 1 is spaced at maximum distance H from the plane portion 3 while observing the following conditions:

$$8 > L/H > 3.5;\ 10 > R/H > 4.5;\ \text{and}\ 4.2 > H/r > 3.8.$$

Figure 4:
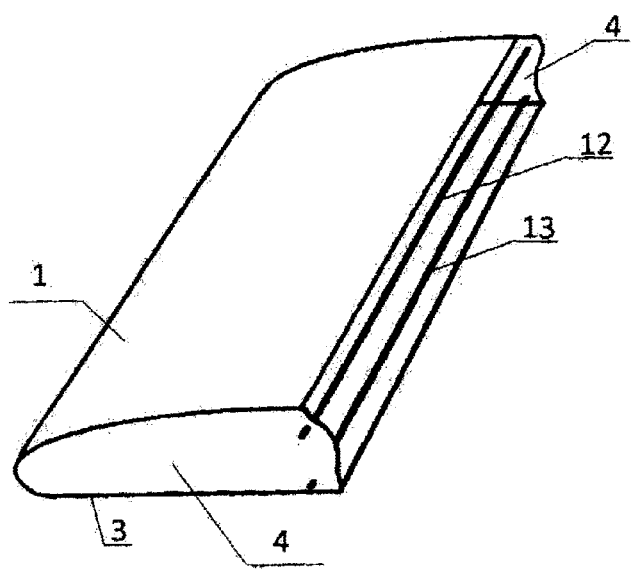
FIG. 4 illustrates the solar collector of the invention with rigidity rods.

The absorber 5 is placed into the enclosure, and the interior of the collector is then sealed with end-face covers 4 that have the cross section of the same profile as the cross section of the enclosure. Tubes (not shown) that supply the heat carrier to the absorber 5 and remove the heat carrier from the absorber 5 pass through the end-face covers 4. In order to prevent sagging of the collector enclosure, which may occur in the central cylindrical portion 1 under effect of a snow load, the collector may be provided with a rigidity rod 12 (FIG. 4) that is placed inside the enclosure, extends in the longitudinal direction of the enclosure near the central cylindrical portion 1, and projects outside the enclosure through the end-face covers 4. For symmetry of the load on the end-face covers 4, the collector may be provided with an additional rigidity rod 13 located inside the enclosure near the plane portion 3 and oriented in the longitudinal direction of the enclosure. The rigidity rods 12 and 13 are secured by fasteners (not shown) which at the same time provide additional pressing of end-face covers 4 to the end faces of the enclosure and improve sealing of the collector interior.

In order to prevent accumulation of condensation moisture on the inner surfaces of the collector and in order to equalize pressures inside and outside the collector, the end-face covers 4 of the collector are provided with ventilation openings that are protected from penetration of rain water.

Figure 5:
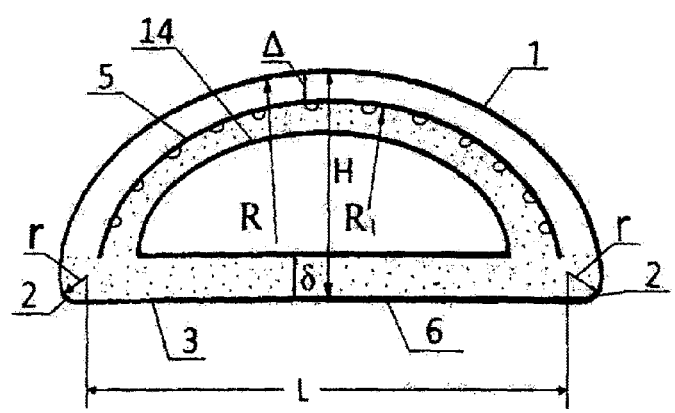
FIG. 5 illustrates a second embodiment of the solar collector of the invention with a heat-receiving device in the form of an absorber defined by a cylindrical portion and provided with an insert.

The solar collector of the second embodiment (FIG. 5) has a space that is too large for filling the entire volume with a heat insulation 6, since this would lead to unjustifiable expenses and to increase in the collector mass. This space is located on the rear side of the collector between the absorber 5 and the plane portion 3 of the enclosure. The following conditions should be observed for the collector of the second embodiments:

$$3 > L/H > 2;\ 3.5 > R/H > 1.1;\ 9 > H/r > 5;\ \text{and}\ 2 > r/\delta > 0.4,$$

where $\delta$ is thickness of the thermal insulation.

A collector of this type can be provided with a hollow insert 14 located between the absorber 5 and the heat insulation 6.

Figure 6:
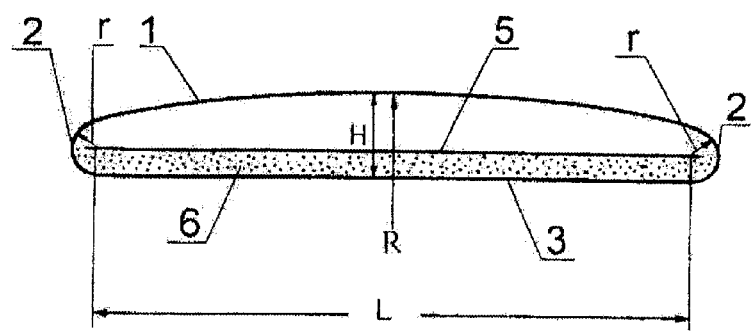
FIG. 6 illustrates a third embodiment of the solar collector of the invention with a heat-receiving device in the form of a flat absorber.

The absorber of the solar collector of the third embodiment (FIG. 6) is flat, and should satisfy the following condition:

$$8 > L/H > 5;\ 18 > R/H > 6;\ 5 > H/r > 3;\ \text{and}\ 2 > r/\delta > 0.4.$$

Figure 7:
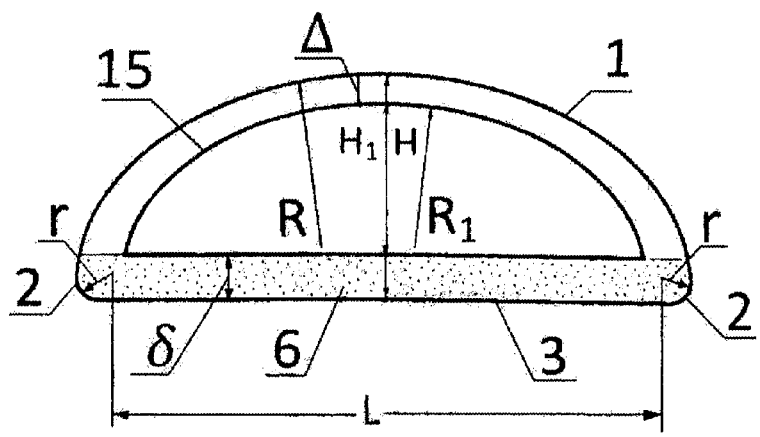
FIG. 7 illustrates a fourth embodiment of the solar collector of the invention with a heat-receiving device in the form of a storage tank.

In the solar collector of the fourth embodiment (FIG. 7), the heat-receiving device, which is intended for transfer of heat to the heat carrier, is made in the form of a storage tank 15, the front surface of which is covered with a selective coating while a heat insulation 6 that has a thickness $\delta$ is located on the rear side of the collector. The storage tank is defined by a cylindrical portion that has radius $R_1$ and an axis that coincides with the axis of the central cylindrical portion 1, which is spaced from cylindrical portion of radius $R_1$ at distance $\Delta$, and by a plane that is parallel to the plane portion 3 of the enclosure. The height $H_1$ of the storage tank is equal to $H_1 = H - \delta - \Delta$. The storage tank 15 of such a shape makes it possible to increase the ratio of the heat-receiving surface to the aperture area of the opening and at the same time provides the optimal value of the storage-tank volume/surface ratio, thus reducing loss of heat to the environment.

The following conditions should be observed for the collector of the fourth embodiment:

3>$L/H$>2; 3.5>$R/H$>1.1; 9>$H/r$>5; and 2>$r/\delta$>0.4.

The solar collector of the invention operates as described below.

Solar rays pass through the transparent enclosure of the collector, fall onto the surface of the absorber 5, which has a selective coating, and are absorbed by the absorber's surface. As a result, the surface of the absorber 5 is heated. From the surface of the absorber 5, the heat is transferred to a heat carrier (water or antifreeze) that circulates in the tubes 11. The heat carrier transfers the heat to a heat accumulator (not shown) which is located beyond the limits of the collector.

When in the collector with the built-in storage tank 15 the heat-receiving surface of the tank is heated by solar rays, it transfers the heat directly to the heat carrier contained in the storage tank 15. The heated heat carrier is delivered from the storage tank 15 to consumers as needed. The storage tank 15 is connected to a water-supply system or to another source wherefrom the cool heat carrier is obtained to replenish the spent one. An important condition for effective operation of the collector with the built-in storage tank 15 is maximal decrease of heat loss to the environment. Observation of this condition delays cooling of the heat carrier in the storage tank 15 during overcast weather. The above condition is achieved by covering the heat-receiving surface of the storage tank 15 with a selective coating that diminishes loss of heat through radiation, by making the enclosure from a transparent multi-layered cellular polymer, e.g., polycarbonate, which reduces loss of heat through convection, and by providing the optimal ratio of storage-tank volume to its surface.

The method of an embodiment of the invention for manufacturing the solar collector is carried out as described below.

Figure 8:
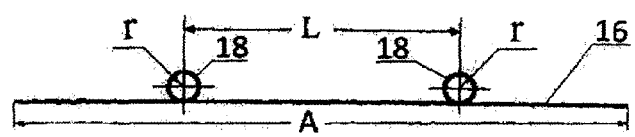
FIG. 8 shows initial positions of the enclosure sheet, guiding cylindrical members, and areas to be softened.
Figure 9:
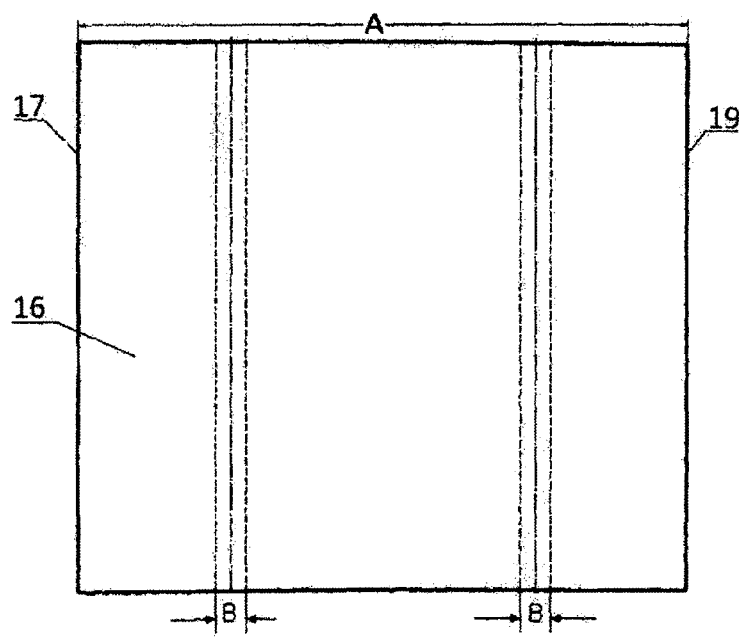
FIG. 9 is a top view of the positions shown in FIG. 8.
Figure 10:
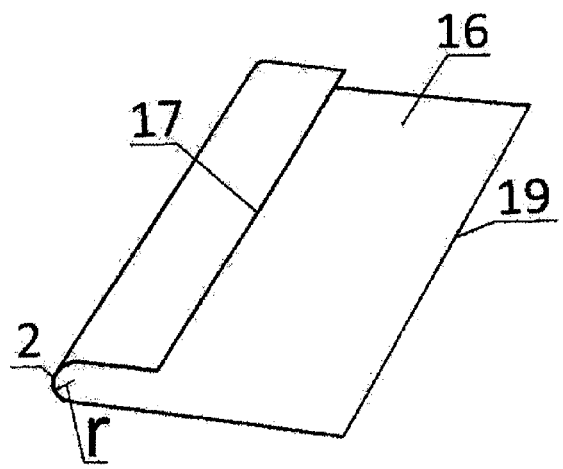
FIG. 10 shows the sheet bent on one side with the formation of one lateral cylindrical portion having radius r.
Figure 11:
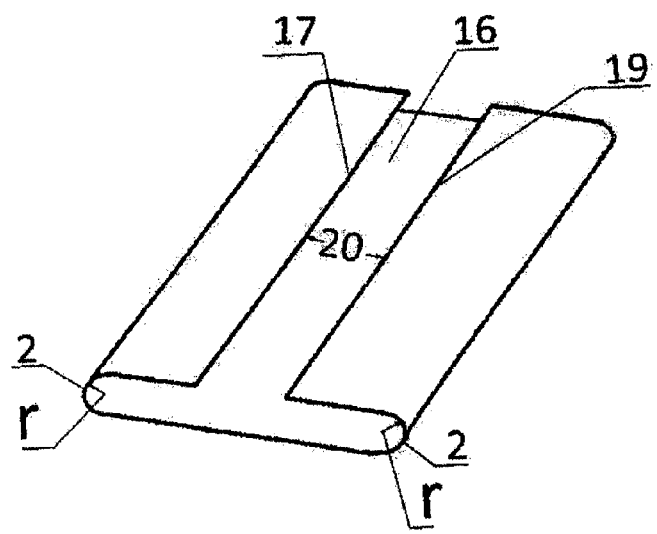
FIG. 11 shows the sheet bent from both sides with the formation of two lateral cylindrical portions having radius r and a gap between edges of the sheet (the sheet planes are fixed in the horizontal position).
Figure 12:
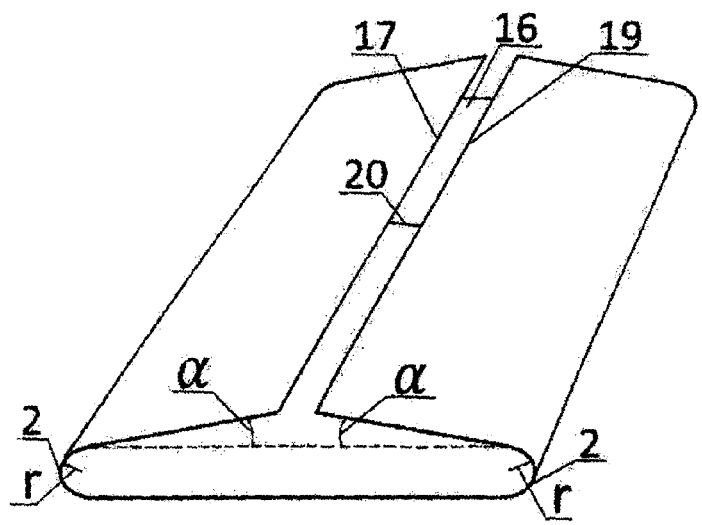
FIG. 12 shows the sheet bent from both sides with the formation of two lateral cylindrical portions having radius r and a gap between edges of the sheet (the sheet planes are fixed in an inclined position).
Figure 13:
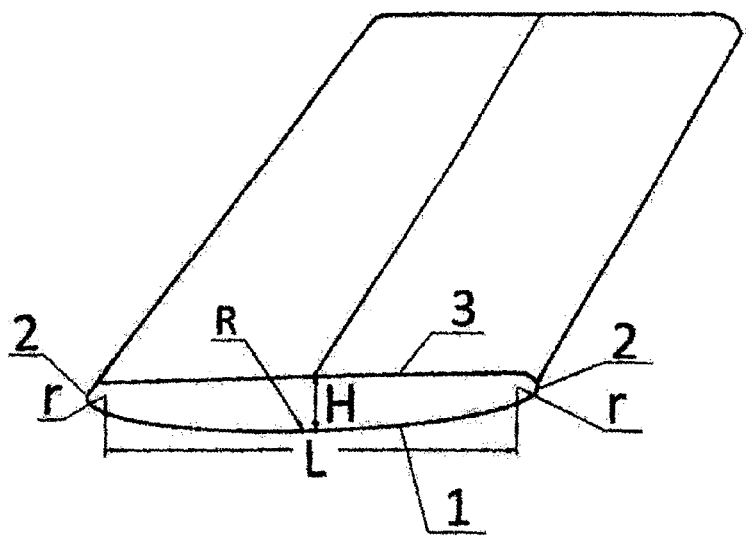
FIG. 13 illustrates the enclosure of the solar collector of the invention.

A guiding cylindrical member 18 having radius r is placed onto the surface of a single- or multi-layered sheet 16 of a transparent polymer material having width A (FIG. 8), the cylindrical member 18 being arranged along the sheet edge 17. The temperature of the polymer material is increased along guiding cylinder member 18, e.g., by a heater (not shown) to the softening point of this material. The width of the softening "strip" is in the range of 3πr>B>πr (FIG. 9). The sheet 16 is bent around the cylindrical member 18 to form one lateral cylindrical portion 2 having radius r (FIG. 10). Next, the guiding cylindrical member 16 is placed on the surface of the sheet 16 along the opposite edge 19 at a distance L>*A/2−πr) from the first position of the cylindrical member 18 and symmetrically thereto. The temperature of the polymer material along the cylindrical member 18 is increased to the softening point of the polymer material by means of the heater for a second time. The sheet 16 is bent around the cylindrical member 18 to obtain another lateral cylindrical portion 2 having radius r. In this case, a gap 20 is formed between the edges 17 and 19 of the bent sheet 16 (FIGS. 11 and 12). The edges are then brought in contact with each other and bonded so that a plane portion 3 is formed on the edge-connection side of the sheet 16 opposite to the central cylindrical portion 1 that has radius R (FIG. 13).

By changing distance L between the axes of the cylindrical member 18 and thus changing the magnitude of the gap 20, it becomes possible to change radius R of the central cylindrical surface portion 1 in the transparent enclosure from infinity (when the face side and the rear side of the enclosure are parallel to each other) to R>$R_{alw}$, where $R_{alw}$ is a curvature radius allowable for bending the polymer material of the enclosure in a solid state.

The above-described methods allows the use of an additional guiding cylindrical member 18 having radius r that can be placed on the surface of the sheet 16 along its opposite edge 19 at a distance L>(A/2−πr) from the first cylinder 18 and symmetrically with respect to the latter.

When the sheet 16 is bent around the guiding cylindrical members 18, the plane portions of the sheet 16 can be fixed in the horizontal position (FIG. 11) or in a position inclined at angle α (FIG. 12). By changing angle α in combination with the gap 20, it becomes possible to change radius R in the central cylindrical portion 1 of the transparent enclosure within the limits required for insertion of absorbers 5 of different configurations.

INDUSTRIAL APPLICABILITY

All design and manufacturing steps of the embodiments of the present invention described above are easy to accomplish and control. The proposed technique makes it possible to produce transparent single- or multi-layered enclosures for solar collectors having heat absorbers of different configurations and at the same time to optimize thermal, optical, and cost characteristics of the collectors. This, in turn, provides conditions for wide industrial application of the invention in the field of solar engineering.

The invention claimed is:

1. A solar collector comprising an enclosure comprising a transparent single-layered or multi-layered polymer material comprising a central cylindrical portion, two lateral cylindrical portions connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of an absorber with channels for circulation of a liquid heat carrier, the front side of the absorber being coated with a selective coating while the rear side thereof having thermal insulation, wherein the absorber is defined by a cylindrical portion having an axis that coincides with the axis of the central cylindrical portion of the enclosure, wherein the collector further comprises a rigidity rod which is located inside the enclosure and extends in the longitudinal direction of the enclosure in the vicinity of the central cylindrical portion.

2. The collector according to claim 1, wherein the collector further comprises an additional rigidity rod which is located inside the enclosure and extends in the longitudinal direction of the enclosure in the vicinity of the plane portion.

3. The collector according to claim 1, wherein the absorber further comprises thin-walled modules connected to each other and having on their rear sides bulges that have channels with inward-facing slits, the channels for circulation of the heat carrier being formed by tubes pressed into the channels with slits.

4. A solar collector comprising an enclosure made from a transparent single-layered or multi-layered polymer material comprising a central cylindrical portion, two lateral cylindrical portions connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of storage tank that has a selective coating on its front side and thermal insulation on the rear side, wherein the storage tank is defined by a cylindrical portion having an axis that coincides with the axis of the central cylindrical enclosure and by a plane that is parallel to the plane of the enclosure, wherein the collector further comprises a rigidity rod which is located inside the enclosure and extends in the longitudinal direction of the enclosure in the vicinity of the central cylindrical portion.

5. The collector according to claim 4, wherein the collector further comprises an additional rigidity rod which is located inside the enclosure and extends in the longitudinal direction of the enclosure in the vicinity of the plane portion.

6. A solar collector comprising an enclosure made from a transparent single-layered or multi-layered polymer material comprising a central cylindrical portion, two lateral cylindrical portions connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of an absorber with channels for circulation of a liquid heat carrier, the front side of the absorber being coated with a selective coating while the rear side thereof being provided with thermal insulation, wherein the absorber is defined by a cylindrical portion having an axis that coincides with the axis of the central cylindrical portion of the enclosure and consists of thin-walled modules connected to each other and having on their rear sides bulges that have channels with inward-facing slits, the channels for circulation of the heat carrier being formed by tubes pressed into the channels with slits, wherein the collector further comprises a hollow insert located between the absorber and the thermal insulation.

7. The collector according to claim 6, wherein the collector further comprises a rigidity rod which is located inside the enclosure and extends in the longitudinal direction of the enclosure in the vicinity of the central cylindrical portion.

8. The collector according to claim 6, wherein the collector further comprises an additional rigidity rod which is located inside the enclosure and extends in the longitudinal direction of the enclosure in the vicinity of the plane portion.

9. The collector according to claim 8, characterized by the fact that it is provided with a hollow insert located between the absorber and the thermal insulation.

10. The collector according to claim 6, wherein each of the thin-walled modules comprises a convex outer side.

11. A solar collector comprising an enclosure made from a transparent single-layered or multi-layered polymer material comprising a central cylindrical portion, two lateral cylindrical portions connected to the central cylindrical portion, a plane portion tangential to the lateral cylindrical portions, two end-face covers installed on the enclosure end faces, and a heat-receiving device arranged inside the enclosure for transferring heat to a heat carrier and made in the form of an absorber with channels for circulation of a liquid heat carrier, the front side of the absorber heat carrier being coated with a selective coating while the rear side thereof being provided with thermal insulation, wherein the absorber consists of thin-walled modules connected to each other and having on their rear sides bulges that have channels with inward-facing slits, the channels for circulation of the heat carrier being formed by tubes pressed into the channels with slits, wherein the collector further comprises a rigidity rod which is located inside the enclosure and extends in the longitudinal direction of the enclosure in the vicinity of the central cylindrical portion.

12. The collector according to claim 11, wherein each of the thin-walled modules comprises a convex outer side.

13. The collector according to claim 11, wherein the collector further comprises an additional rigidity rod which is located inside the enclosure and extends in the longitudinal direction of the enclosure in the vicinity of the plane portion.

14. The collector according to claim 11, wherein the absorber is flat.

15. A method of manufacturing an enclosure for a solar collector comprising: placing a guiding cylindrical member onto the surface of a single- or multi-layered sheet of transparent polymer material along one of the sheet edges; increasing the temperature of the polymer material along the guiding cylinder member to the softening point of the polymer material by means of a heater; bending the sheet around the cylindrical member to form one lateral cylindrical portion; arranging the guiding cylindrical member or an additional guiding cylindrical member on the sheet surface along the opposite edge of the sheet at a distance from the first position of the cylindrical member and symmetrically thereto; increasing the temperature of the polymer material along the guiding cylindrical member to the softening point of the polymer material; bending the sheet around the cylindrical member to form another lateral cylindrical portion and a gap between the edges of the bent sheet; bringing the edges in contact with each other; and bonding them together so that a plane portion is formed on the edge-connection side opposite the lateral a central cylindrical portion.

16. The method of manufacturing an enclosure for the solar collector according to claim 15, wherein during bending of the sheet around the guiding cylindrical member, the plane portions of the sheet are fixed in the horizontal position.

17. The method of manufacturing an enclosure for the solar collector according to claim 15, wherein during bending of the sheet around the guiding cylindrical member, the plane portions of the sheet are fixed in an inclined position.

18. The method of manufacturing an enclosure for the solar collector according to claim 15, wherein during bending of the sheet around the guiding cylindrical member, the plane portions of the sheet are fixed in the horizontal position.

19. The method of manufacturing an enclosure for the solar collector according to claim 15, wherein during bending of the sheet around the guiding cylindrical member, the plane portions of the sheet are fixed in an inclined position.

* * * * *